J. R. GAMMETER.
MANUFACTURE OF RUBBER TUBING.
APPLICATION FILED MAY 2, 1916.
1,210,455.
Patented Jan. 2, 1917.
5 SHEETS—SHEET 4.
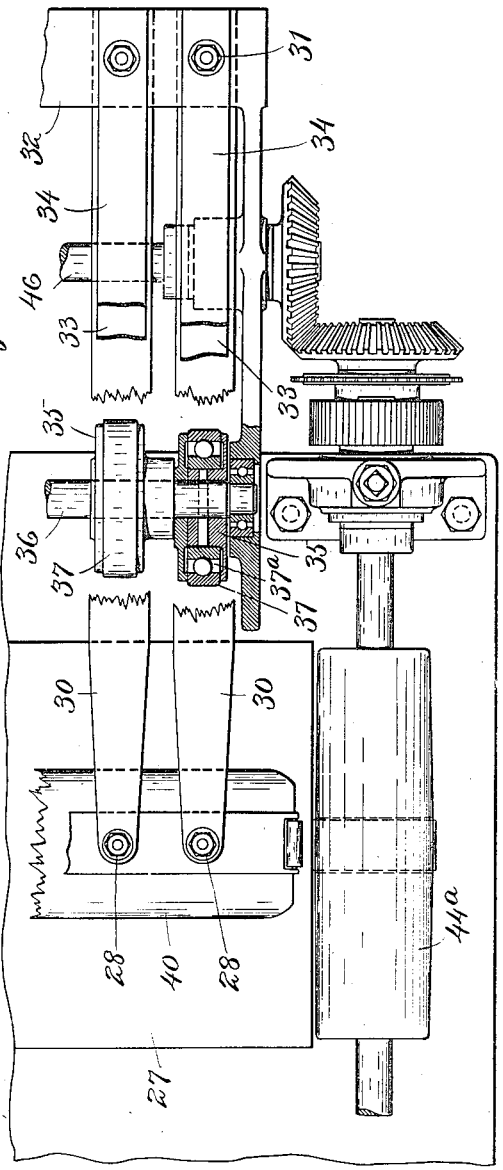
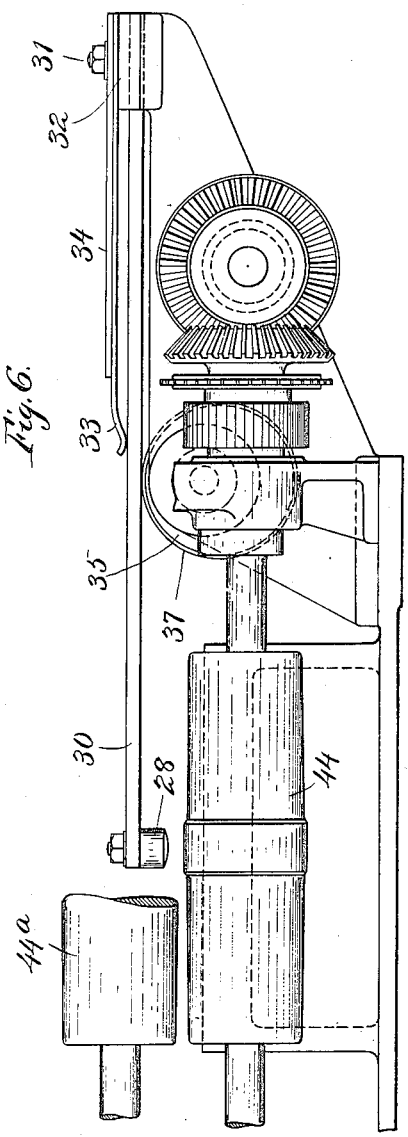
INVENTOR.
J. R. Gammeter
BY Robert M. Pierson
ATTORNEY

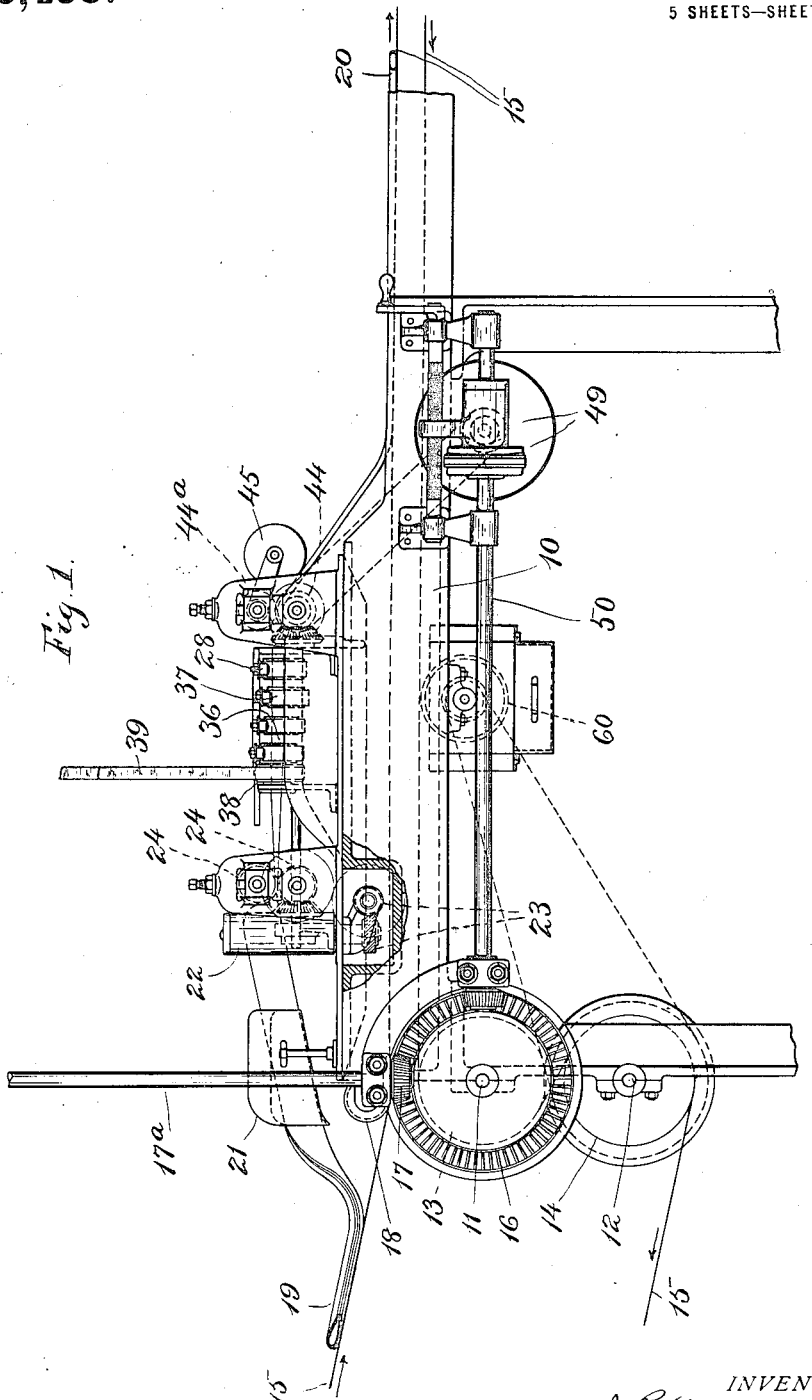

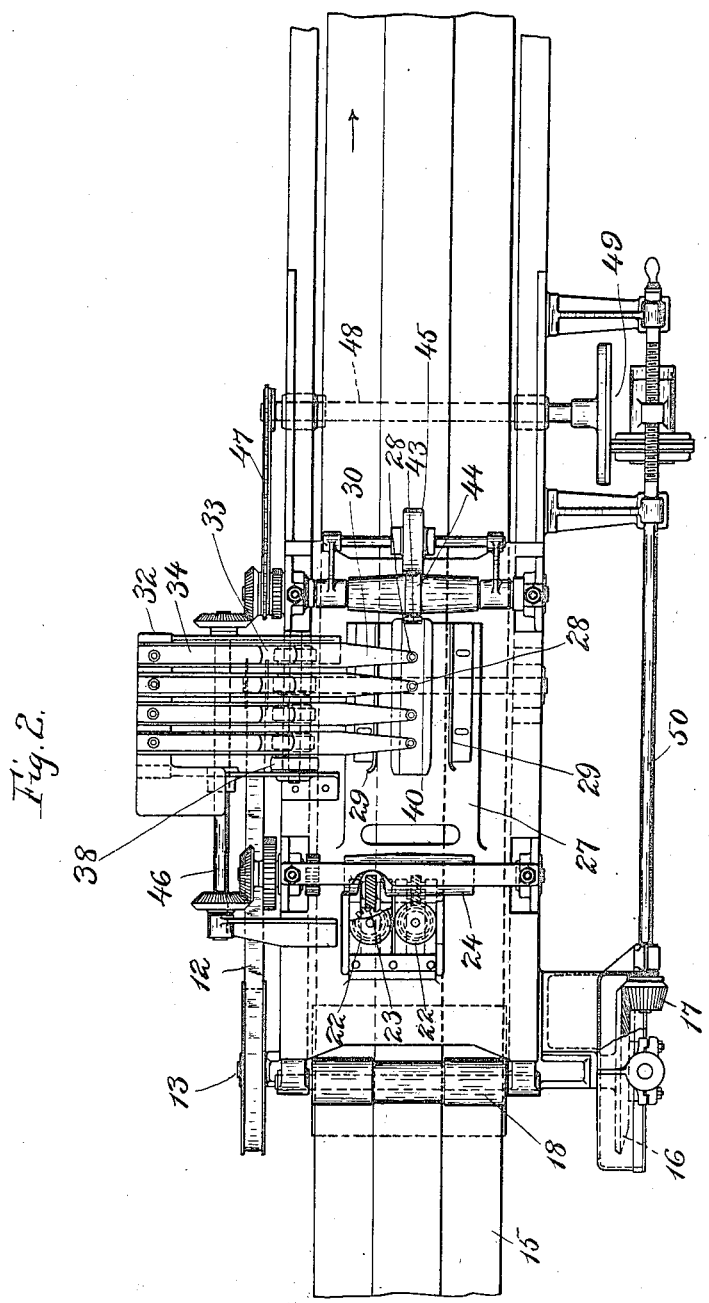

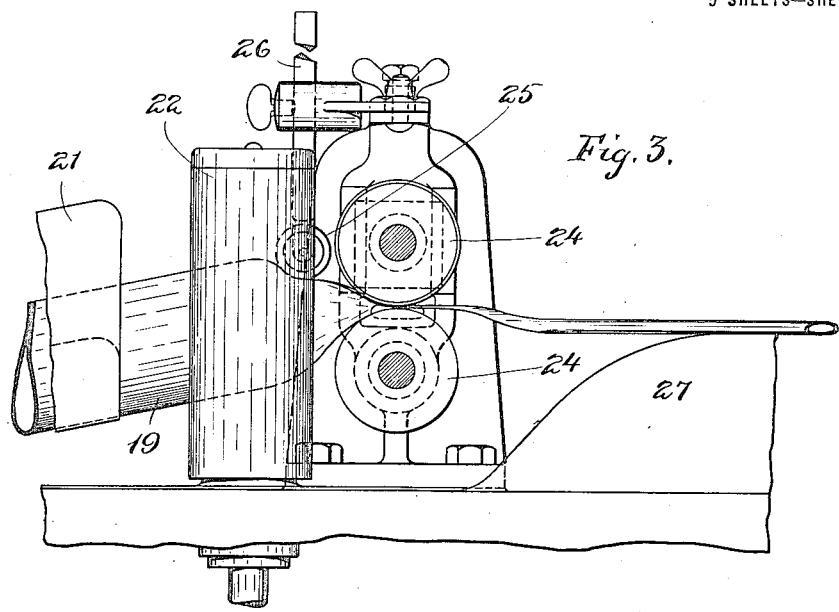
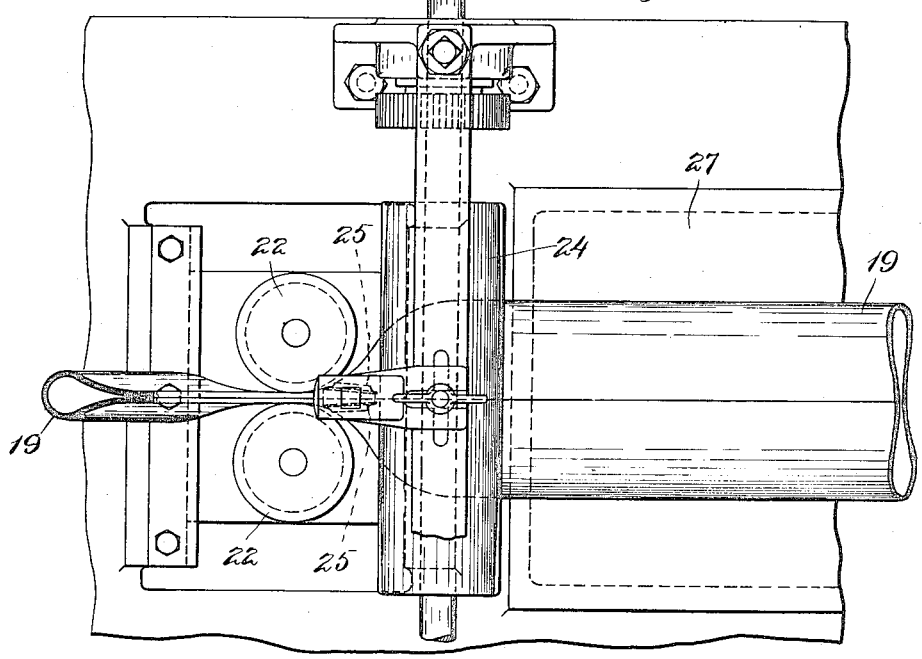

J. R. GAMMETER.
MANUFACTURE OF RUBBER TUBING.
APPLICATION FILED MAY 2, 1916.

1,210,455.

Patented Jan. 2, 1917.
5 SHEETS—SHEET 5.

INVENTOR.
J.R. GAMMETER.
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

MANUFACTURE OF RUBBER TUBING.

1,210,455. Specification of Letters Patent. Patented Jan. 2, 1917.

Application filed May 2, 1916. Serial No. 94,893.

*To all whom it may concern:*

Be it known that I, JOHN R. GAMMETER, a citizen of the United States, residing at Akron, in the county of Summit and State of Ohio, have invented certain new and useful Improvements in the Manufacture of Rubber Tubing, of which the following is a specification.

This invention relates to a method and apparatus for uniting edges of raw rubber, and especially for making a longitudinal butt-weld or seam between the edges of a strip of rubber for the purpose of forming a tube which may, after vulcanization be cut off in lengths whose ends are joined to constitute inner tubes for pneumatic tires; or which may be used as a blank to be sheared off in to rubber bands; or which may be employed for any other purpose to which it is adapted, my object being to form a seam which is practically as strong as the body of the tube and does not require any reinforcement, and also to perform the operation more rapidly than heretofore and thus reduce the cost.

Figures 7, 8:
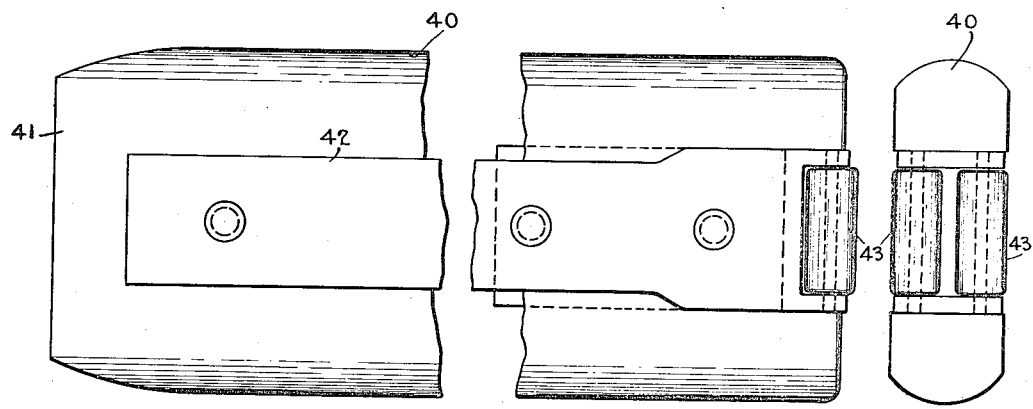
Figure 9:
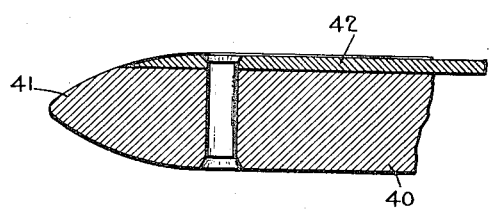

Of the accompanying drawings, Figure 1 represents a side elevation, partly in section, of a rubber-tube seaming machine embodying my improvements and adapted to carry out my improved method. Fig. 2 represents a top plan view thereof. Fig. 3 represents a side elevation, partly in section, showing the devices for performing the first part of the seaming operation. Fig. 4 represents a top plan view of said devices. Fig. 5 represents a top plan view, partly in section, showing a portion of the percussion mechanism. Fig. 6 represents an end view showing said mechanism. Fig. 7 represents a top plan view of the floating mandrel, partly broken away. Fig. 8 represents a posterior end view thereof. Fig. 9 represents a vertical section of the anterior end of the mandrel.

Referring to the drawings, 10 is a frame or table having bearings for a pair of shafts 11, 12, upon which are mounted drums 13, 14 around which a carrier belt 15 passes, the shaft of the upper drum carrying a large bevel gear 16 which receives power through a bevel pinion 17 from a vertical shaft 17ª. The upper stretch of belt 15 passes under a guide pulley 18 and its left hand portion, as viewed in Figs. 1 and 2, feeds the rubber strip 19 to the machine while its right-hand portion carries away the finished tube 20, the belt passing around suitable pulleys at either end, not shown in the drawings, and returning from right to left under the machine, where its lower stretch passes around the drums 14, 16. 60 is a rotary belt brush.

The tube-forming strip 19 in a doubled horizontal position having its edges coated with cement by mechanism at the left, not shown in the drawings, is passed through a guide 21 which turns it into a vertical plane and from thence it passes between a pair of vertical rollers 22, driven by spiral gearing 23 from their lower ends, the shaft of the driving spiral being suitably geared to a pair of horizontal rollers 24, which receive the folded strip from the vertical rollers and flatten it out into a horizontal plane with the seam-forming edges butted together and located in the middle of the upper portion. Between the vertical and horizontal rollers is located a pair of idle rollers 25 mounted on a vertically-adjustable rod 26, the planes of these idle rollers converging in the direction of travel of the rubber strip as viewed from above, in order to crowd the seam-forming edges together.

From the rollers 24 the tube passes over a raised bed 27, above which are located a series of hammers 28 for applying percussion to the edges of the seam in order to weld them together, and a pair of laterally-adjustable side plates 29 to guide the tube in passing under the hammers. Each hammer is mounted at the free end of a spring arm 30, preferably of wood, secured by a bolt 31 to a rail 32 and reinforced by spring-leaves 33, 34 which insure a quick downward return of the hammer. Under the several hammer arms are located a series of eccentrics 35 keyed to a shaft 36 and having ball-bearing straps or rollers 37 on their peripheries bearing directly against the under sides of the arms. As here shown, there are four hammers with their corresponding arms and eccentrics, and the latter are set at different angles symmetrically about the axis of shaft 36, so that the hammer blows are uniformly alternated in their occurrence. The shaft itself is mounted in ball bearings and has a pulley 38 on one end connected by a belt 39 with a suitable source of power such as a separate electric motor by which the eccentric shaft is rotated very rapidly, the percussion of the hammers causing the edges of the tube to become thoroughly welded together.

Within the tube and directly underneath the hammers 28 is located a floating anvil or mandrel 40 in the form of an elongated wooden block having a wedge-shaped nose 41, as seen in Figs. 7 and 9, which spreads the plies of the tube as they go onto the anvil. A metal plate 42, let into the upper side of the latter and located under the line of the seam, forms a hard striking surface, and a pair of top and bottom rollers 43 journaled on the rear end of the anvil prevent the latter from passing between the horizontal delivery rollers 44, 44ª which are located just beyond the series of hammers. These delivery rollers are geared together and positively operated, and there is also a yieldingly mounted idle roller 45 coacting with the lower roller 44, from which the finished tube 20 passes down onto the belt 15. The upper delivery roller 44ª is omitted in Fig. 2 in order to show the lower roller.

The feeding rollers 24 and the delivery rollers 44, 44ª are connected by a shaft 46 and suitable gearing and driven by sprocket and chain gearing 47 from a transverse shaft 48, the latter being rotated by friction gearing 49 from a shaft 50 geared to the large bevel gear 16, the friction gearing being adjustable to regulate the speed of the rollers with reference to that of the belt 15.

The rubber strip 19, coming from the cementing mechanism, which is located at a considerable distance away in order that the cement may have an opportunity partially to dry by the evaporation of the solvent, is turned into a vertical position by the guide 21 as described, passes between vertical rollers 22, under the converging rollers 25 which crowd the cemented edges together, and is flattened out by the horizontal rollers 24 so that the seam lies in the middle of the top ply. The percussion exerted on the edges of the raw rubber by the hammers 28, as the tube passes thereunder, is of such rapid frequency and intensity as to develop a substantial degree of welding heat in the seam which produces a much firmer union of the butted edges than is obtainable by any other means of which I am aware, the joint after vulcanization being practically as strong as any part of the tube and requiring no reinforcement whatever.

My improved method of welding edges of raw rubber by a percussion of such intensity as to develop sufficient heat to assist in the weld may be carried out by any suitable apparatus, and the details of the mechanism forming a part of my invention may be variously modified within the scope of the claims.

I claim:

1. The process of uniting edges of raw rubber which consists in heating and welding them by percussion.

2. The process of making a tube which consists in progressively uniting the edges of a rubber strip by percussion of such intensity as to develop a substantial degree of heat in the joint.

3. The process of making a butt-welded seam between two edges of unvulcanized rubber which consists in coating the edges with rubber solution, evaporating the solvent, bringing the edges together and exerting rapid percussion thereon progressively at a series of closely-adjacent points, said percussion being such as to develop a substantial degree of heat in the joint.

4. The process of making a rubber tube which consists in progressively butting together the edges of a longitudinally-moving doubled strip of raw rubber, and applying to the moving seam at a series of closely-adjacent points percussion of such intensity as to develop heat and cause the edges to weld.

5. In a machine for uniting edges of raw rubber, the combination of means for feeding the material, and a series of percussion hammers for acting on the edges to be joined.

6. In a machine for uniting edges of raw rubber, the combination of means for progressively feeding and crowding together the edges of the material to be joined, and means for exerting rapid percussion thereon at a series of longitudinally adjacent points.

7. In a rubber tube-forming machine, the combination of means for feeding a doubled strip of rubber with its edges at one side, means for progressively flattening the strip into a different plane to bring said edges between the margins and into butted relation, and means for exerting rapid percussion on the butted edges at a series of longitudinally adjacent points.

8. In a rubber tube-forming machine, the combination of means for feeding a doubled strip of rubber in a substantially horizontal plane with its edges at one side, means for twisting the strip into a vertical plane, means for flattening it into a horizontal plane with the edges butted and in the upper ply, and a series of vertically vibrating percussion hammers for acting on the butted seam.

9. In a rubber tube-forming machine, the combination of means for longitudinally feeding a doubled rubber strip with butted edges positioned intermediate of its margins, a floating anvil adapted to occupy the interior of the tube, and a series of percussion hammers coöperating with said anvil for welding the edges together.

10. In a rubber tube-forming machine, the combination of means for feeding a doubled rubber strip, percussion hammers for welding the edges, an interior floating anvil coöperating with said hammers, and delivery rollers for the welded tube coöperating with the posterior end of said anvil.

11. In a rubber tube-forming machine, the combination of means for feeding a doubled rubber strip, percussion hammers for welding together the edges thereof, a floating anvil adapted to lie within the tube beneath said hammers and having anti-friction rollers on its posterior end, and means external to the tube coöperating with said rollers through the walls of the tube for holding the anvil stationary while the tube travels.

12. In a rubber tube-forming machine, the combination of a series of percussion hammers mounted on arms, a shaft having a series of eccentrics fixed thereon at different angles for vibrating the hammer arms, straps or rollers on said eccentrics, and anti-friction bearings between said straps and the eccentrics.

13. In a rubber tube-forming machine, the combination of a series of percussion hammers mounted on flexible arms, means for fixedly supporting said arms at one end, and means for alternately vibrating said arms.

14. In a rubber tube-forming machine, the combination of a series of percussion hammers mounted on flexible wooden arms, which are fixedly supported at one end, means for positively and intermittently actuating said arms in one direction in rapid alternation, and leaf-springs for yieldingly actuating said arms in the opposite direction.

15. In a rubber tube-forming machine, the combination of a series of percussion hammers mounted on flexible wooden arms, a shaft carrying a series of eccentrics located at different angles for vibrating the arms in one direction, and springs for returning the arms in the opposite direction.

In testimony whereof I have hereunto set my hand this 29th day of April, 1916.

JOHN R. GAMMETER.